United States Patent [19]

Kalmanek et al.

[11] Patent Number: 6,094,424
[45] Date of Patent: Jul. 25, 2000

[54] MOBILE HOST ROAMING ATM VIRTUAL CIRCUIT REROUTING METHOD AND APPARATUS

[75] Inventors: Charles Robert Kalmanek, Short Hills; Partho Pratim Mishra, Summit, both of N.J.; Mani B. Srivastava, Los Angeles, Calif.

[73] Assignee: AT&T Corp., New York, N.Y.

[21] Appl. No.: 09/021,310

[22] Filed: Feb. 10, 1998

Related U.S. Application Data

[60] Provisional application No. 60/037,052, Feb. 11, 1997.

[51] Int. Cl.$^7$ .................................................. H04L 12/56
[52] U.S. Cl. ........................ 370/328; 370/397; 370/409; 370/410
[58] Field of Search ...................................... 370/331, 338, 370/395, 396, 397, 401, 402, 409, 410, 328

[56] References Cited

U.S. PATENT DOCUMENTS

| | | | |
|---|---|---|---|
| 5,487,065 | 1/1996 | Acampora et al. | 370/397 |
| 5,539,744 | 7/1996 | Chu et al. | 370/397 |
| 5,590,125 | 12/1996 | Acampora et al. | 370/329 |
| 5,590,126 | 12/1996 | Mishra et al. | 370/329 |
| 5,623,495 | 4/1997 | Eng et al. | 370/397 |
| 5,787,077 | 7/1998 | Kuehnel et al. | 370/331 |

OTHER PUBLICATIONS

"Network Architecture for Mobile and Wireless ATM", Prathima Agrawal et al., May 27, 1996, Proceedings of the 16$^{th}$ International Conference on Distributed Computing Systems, pp. 299–310.

Handling Mobility in a Wireless ATM Network, Bora Akyol et al., Mar. 24, 1996, IEEE, vol. 3 No. Conf. 15, pp. 1405–1413.

Functional Integration of UMTS and B–ISDN, Joost–Pieter Katoen, Jul. 25, 1995, IEEE, vol. 1. Conf. No. 45, pp. 160–164.

Primary Examiner—Min Jung

[57] ABSTRACT

A virtual circuit rerouting method and apparatus provide for rerouting virtual circuits in an ATM-based network having mobile devices. Included are protocols for ensuring hand-off of the mobile device from a first basestation to a second basestation, identification of a rebuild switch and connection of the mobile device to the rebuild switch prior to data being transferred from the mobile device to the network. The rerouting method minimizes loss of data by ensuring that the mobile device is incapable of transferring data to the network before the virtual circuit rerouting procedure is completed. The method includes an aggregate registration request, or 3-phase handshake, and a "Connect Confirm" command. The virtual circuit rerouting protocols are further adapted to operate on most common virtual circuit rerouting strategies, including rebuild, partial rebuild and extension with loop removal.

20 Claims, 5 Drawing Sheets

MOBILE HOST ROAMING ATM VIRTUAL CIRCUIT REROUTING METHOD AND APPARATUS

This nonprovisional application claims the benefit of U.S. Provisional Application No. 60/037,052 entitled "ATM VIRTUAL CIRCUIT REROUTING TO SUPPORT MOBILE HOST ROAMING" filed on Feb. 11, 1997. The Applicants of the Provisional Application are Charles R. Kalmanek, Jr., Mani B. Srivastava and Partho Mishra. The Attorney Docket Number is KALMANEK 15-6-4.

The Provisional Application is herein incorporated by reference including all the references cited therein.

BACKGROUND OF THE INVENTION

1. Field of Invention

The invention relates to telecommunications systems. In particular, the invention relates to a method and apparatus for rerouting wireless mobile communication networks.

2. Description of Related Art

Wireless networks and mobile computing have become more widespread in recent years. While the dominant architectural model for wireless access has been cellular telephones, other architectures are expanding into the wireless domain. One such architecture is asynchronous transfer mode (ATM) network communications.

ATM networks involve establishing virtual circuits, or end-to-end paths, between stations to make connections. In this context, a station can be mobile or fixed in the virtual circuit. In a virtual circuit, a logical connection is established between two (or more) stations before any data packets are transmitted. A first station (packet originator) sends a call request to an ATM switch to which it is connected. The ATM switch then forwards the call request to intermediate switches and finally to a serving node in the ATM network, which sets up a route in advance to the desired destination. All data packets of a particular message traverse this route, and each data packet of the message contains a virtual circuit identifier (VCI), which is modified at each switch along the route, and the packet data. At any one time, each station can have more than one virtual circuit to any other station. That is, a station can establish a virtual circuit for video data and a virtual circuit for audio data. Further, the station can have virtual circuits to more than one station (i.e., multipoint).

ATM signaling is responsible for establishing the end-to-end path and for tearing down the path when data transfer is completed. The process of settling up the virtual circuit causes each segment in the virtual circuit to be assigned a local VCI. That is, at each switch in the virtual circuit, the local VCI is established. Standards bodies such as the ATM Forum have standardized ATM signaling messages that accomplish setup and tear-down of a virtual circuit.

An ATM signaling layer makes use of a Service Specific Connection Oriented Protocol (SSCOP) for reliable transmission of ATM signaling messages. The reliable mode of SSCOP requires, prior to establishing an ATM signaling association, a separate SSCOP "handshake". The ATM signaling association is required for two adjacent switches in the virtual circuit to exchange data. If the SSCOP fails, timers associated with some of the signaling protocols may allow recovery of lost data.

As a mobile host roams geographically, it may move from the vicinity of one basestation to another and thus change the basestation with which it is registered. This process is called a hand-off. Maintaining data flow for a mobile host as it is handed off from one basestation to another involves two layers of the wireless ATM protocol stack. First, the medium access control protocol needs to ensure that the mobile host is able to acquire air bandwidth resources at the new basestation with minimal disruption and network connectivity. Second, maintaining data flow to mobile hosts also requires the rerouting of virtual circuits terminating at or originating from the mobile host.

Virtual circuit routes need to be continually modified as mobile hosts during the lifetime of the virtual circuit connection. The rerouting must be done fast enough so as to cause minimal disruption to applications while minimizing the signaling overhead. Also, any rerouting should minimize the loss of data packets. There may appear to be obvious solutions to this problem from the analogous problem in the connection-oriented cellular or the connection-less mobile Internet protocol (IP) world. However, the scale of the problem with ATM is different. First, ATM usually involves smaller cell sizes resulting in more frequent hand-offs. Second, each terminal can terminate a large number of virtual circuits, leading to a large number of virtual circuit reroutes at each hand-off. Third, the statistical multiplexing inherent in ATM and multi-media traffic requires a quality of service renegotiation at the new station, compared to the relatively simple frequency or time slot allocation in cellular and PCS applications, thereby increasing the latency period in which data cannot be transferred.

SUMMARY OF THE INVENTION

The present invention solves the problem of rerouting ATM virtual circuits in a mobile computing environment by providing signaling messages to implement a common set of virtual circuit rerouting primitives. In particular, the invention provides for rapid hand-off of mobile hosts, reduces the latency period in which data flow is blocked, allows the mobile computing environment to differentiate between data transmission errors and loss of data due to mobile host roaming and reduces data loss during hand-off.

In a mobile ATM environment, as mobile hosts move from one basestation to the next, virtual circuits terminating at or originating from the mobile host must be reestablished, or rerouted through different network elements. To effectuate the rerouting, the mobile host initiates a three-way handshake in which the mobile host and the new basestation both agree that registration with the new basestation has occurred and that the rerouting protocol can handle situations where the mobile host moves again before the signaling associated with the hand-off has completed.

The new and the old basestations then execute rebuild and release messages to establish a new virtual circuit. The mobile host and the new basestation then execute connect and connect confirm messages to reinitiate the flow of data between the mobile host and the network.

These and other features and advantages of the invention are described in or are apparent from the following detailed description of the preferred embodiments.

BRIEF DESCRIPTION OF THE DRAWINGS

The invention is described in detail with reference to the following drawings, wherein like numerals refer to like elements, and wherein.

DETAILED DESCRIPTION OF PREFERRED EMBODIMENTS

Figure 1:
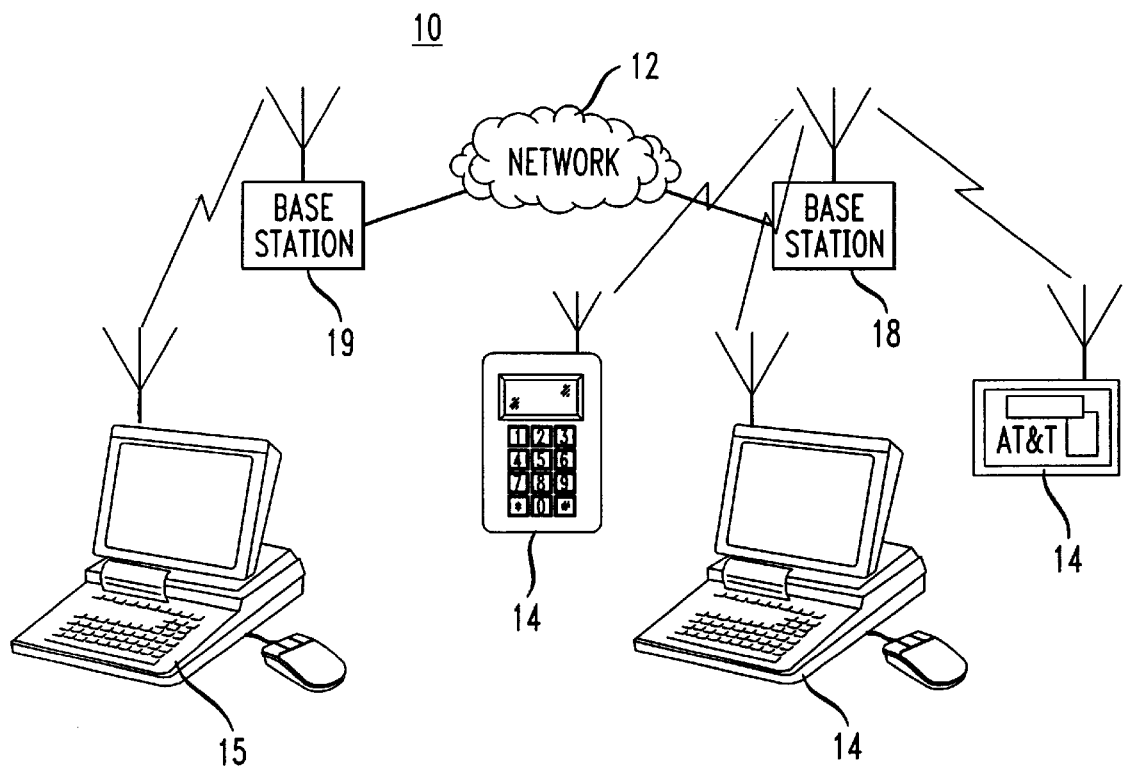
FIG. 1 is a communications environment according to an embodiment of the invention.

FIG. 1 shows an exemplary embodiment of a communications environment 10 that supports establishing and rerouting virtual circuits to and from mobile hosts and that provides quality of service guarantees for the virtual circuits as the mobile hosts roam. In FIG. 1, a wired backbone network 12 connects to basestations 18 and 19. The network 12 may include, for example, a hierarchy of local area networks and wide area networks using a virtual circuit-oriented switching paradigm. The basestations 18 and 19 are ATM switches equipped with wireless adapter cards. The basestations 18 and 19 act as gateways for communications between the network 12 and the mobile hosts 14 and 15. The geographical area for which the basestations 18 and 19 act as a gateway is called a cell. Connectivity between the mobile hosts 14 and 15 and the network 12 is continuously maintained as the mobile hosts 14 and 15 roam from one cell to another.

A mobile host can have all the capabilities of a wired network host and therefore is able to participate in complex signaling and data transfer protocols. In FIG. 1, the mobile host 14 can be a cellular phone, a personal data apparatus and a laptop computer. However, the invention is not limited to these communications devices, and any communications device capable of being adapted for wireless use (e.g., by installing a wireless adapter card) can be used with the communications environment 10.

Virtual circuits are established to provide end-to-end virtual circuit connectivity in the communications environment 10 of FIG. 1, and the virtual circuits are rerouted as the mobile hosts 14 and 15 roam from cell to cell. Establishing and rerouting of virtual circuits in a mobile environment is discussed in detail in U.S. Pat. No. 5,590,126, "Method for Call Establishment and Rerouting in Mobile Computing Networks," which is hereby incorporated by reference.

In the communications environment 10 shown in FIG. 1, the mobile host 14 can be expected to frequently cross cell boundaries, necessitating rerouting of the virtual circuits. To maintain connectivity, the mobile host 14 and the basestations 18 and 19 may engage in a "soft-hand-off," in which the mobile host 14 is able to communicate with both the basestations 18 and 19 as the mobile host 14 roams from cells controlled by the basestation 18 to cells controlled by the basestation 19 and while the virtual circuits are being rerouted. However, the mobile host 14 may also encounter "hard-hand-offs," in which the mobile host 14 loses contact with its old basestation when, or even before establishing contact with its new basestation.

To execute a hand-off from the old basestation 18 to the new basestation 19, the mobile host 14 communicates a registration request message to the new basestation 19 and receives an acknowledgment from the new basestation 19. The new basestation 19 then sends a rebuild message to the old basestation 18.

Figure 2:
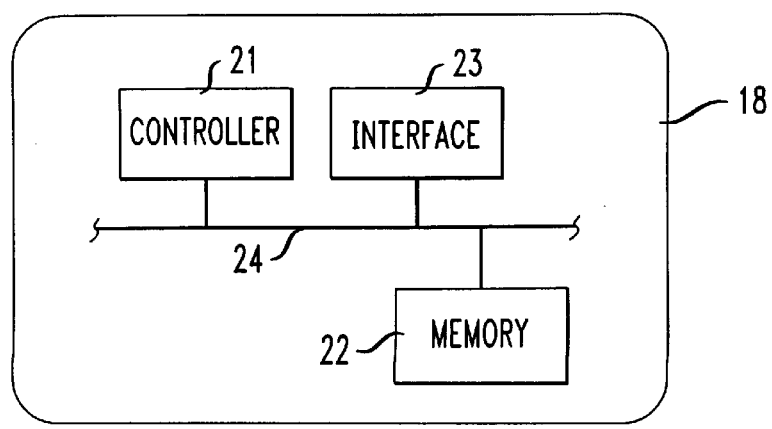
FIG. 2 is a diagram of a basestation.

FIG. 2 shows a basestation 18 according to the invention. In FIG. 2, an interface 21 receives communications from and transmits communications to mobile hosts 14 and 15. A memory 22 stores network configuration data, programs and virtual circuit routing strategies. A controller 23 controls operation of the basestation 18 over two-way signal line 24.

Figure 3A:
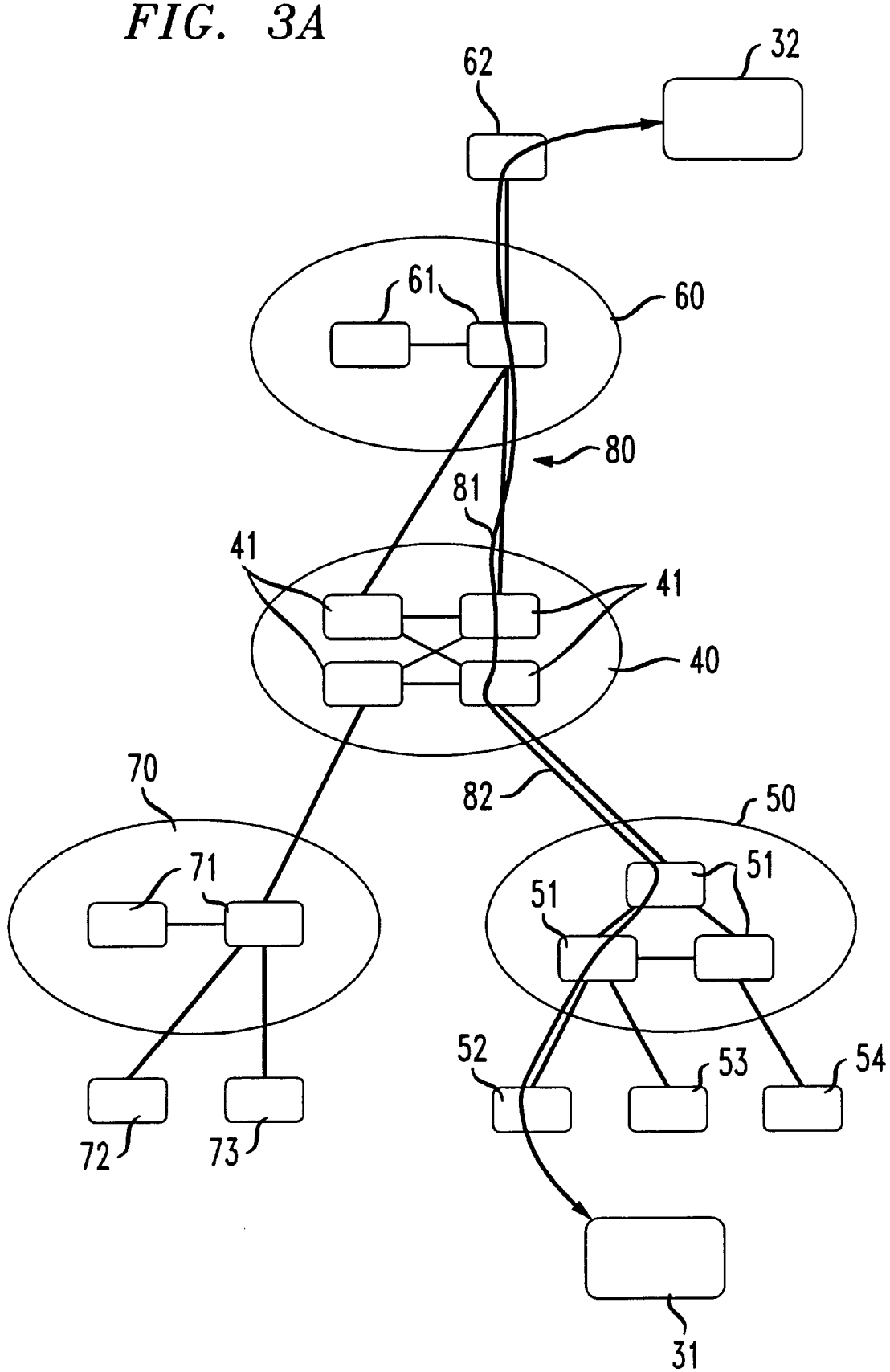
FIGS. 3A and 3B illustrate a partial rebuild rerouting strategy.
Figure 3B:
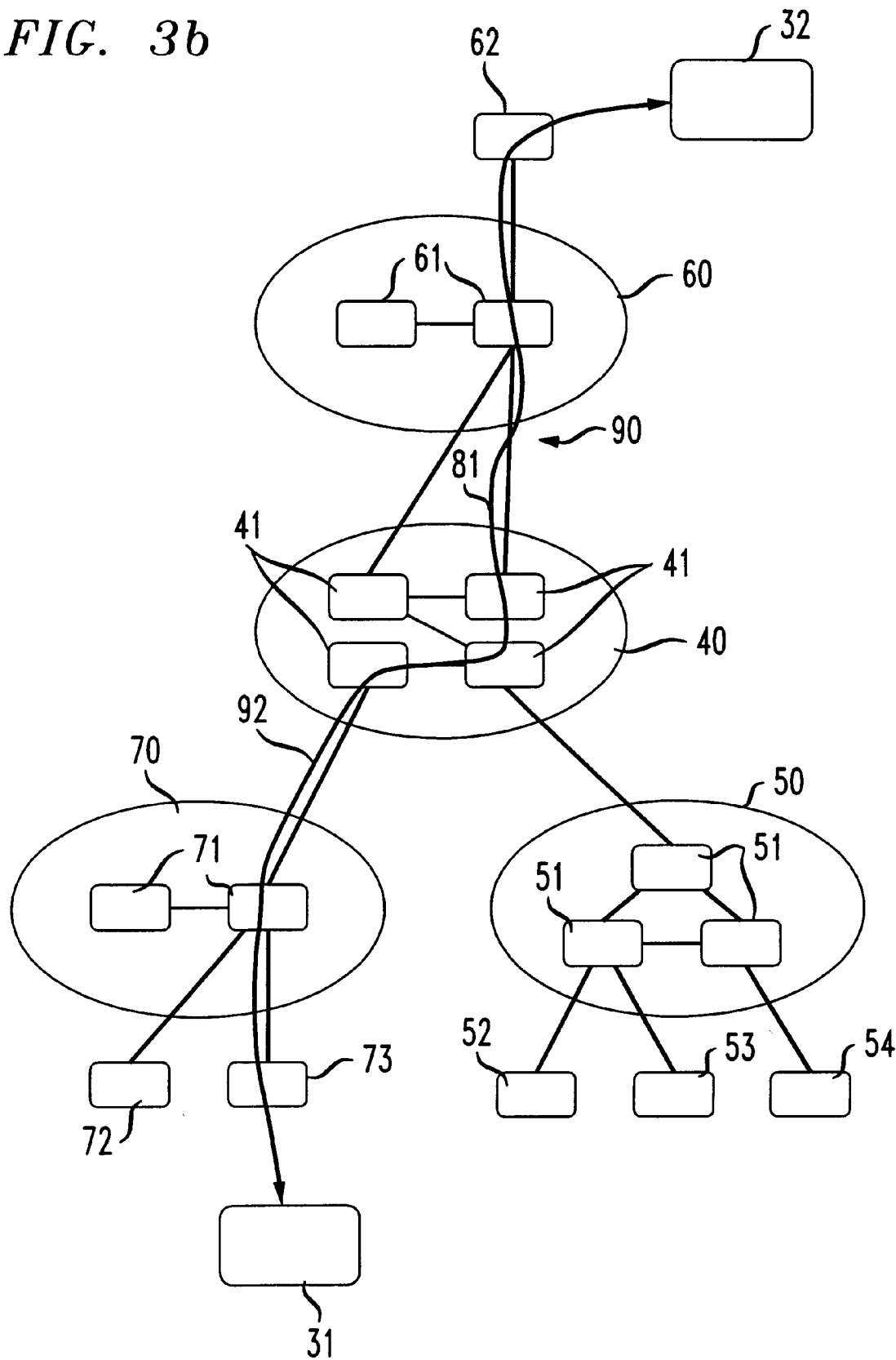

FIGS. 3A and 3B show an example of a virtual rerouting strategy. In FIG. 3A, a first mobile host 31 communicates with a second mobile host 32 through a local network 50, a central network 40 and a local network 60. The local network 50 includes switches 51 and basestations 52, 53 and 54. The local network 60 includes switches 61 and a basestation 62. The central network 40 includes switches 41. The switches 41, 51 and 61, the networks 40, 50 and 60, and the paths between these elements define virtual circuit segments that establish the route of communication to result in a virtual circuit 80. The virtual circuit 80 includes one or more segments, such as segments 81 and 82. Also connected to the central network 40 is local network 70, including switches 71 and basestations 72 and 73.

In an ATM-based network environment, at least both end points must be designated, and end-to-end virtual circuits established before any data can flow. Obviously, to support a hand-off, the virtual circuit must be modified or rerouted to continue the data flow. In FIG. 3B, the mobile host 31 has moved outside the area covered by the local network 50 to the area covered by the local network 70. Thus, the virtual circuit 80 can no longer provide connectivity between the mobile hosts 31 and 32. The virtual circuit 80 must therefore be rerouted into a virtual circuit 90. In this example, a "partial rebuild" of the virtual circuit 80 to form the virtual circuit 90 is completed. The method for executing the "partial rebuild" is described in U.S. Pat. No. 5,590,126. The resulting virtual circuit 90 (which includes segments 81 and 92) now connects the mobile hosts 31 and 32 through the local network 70 (including basestation 73), the central network 40 and the local network 60.

Figure 4:
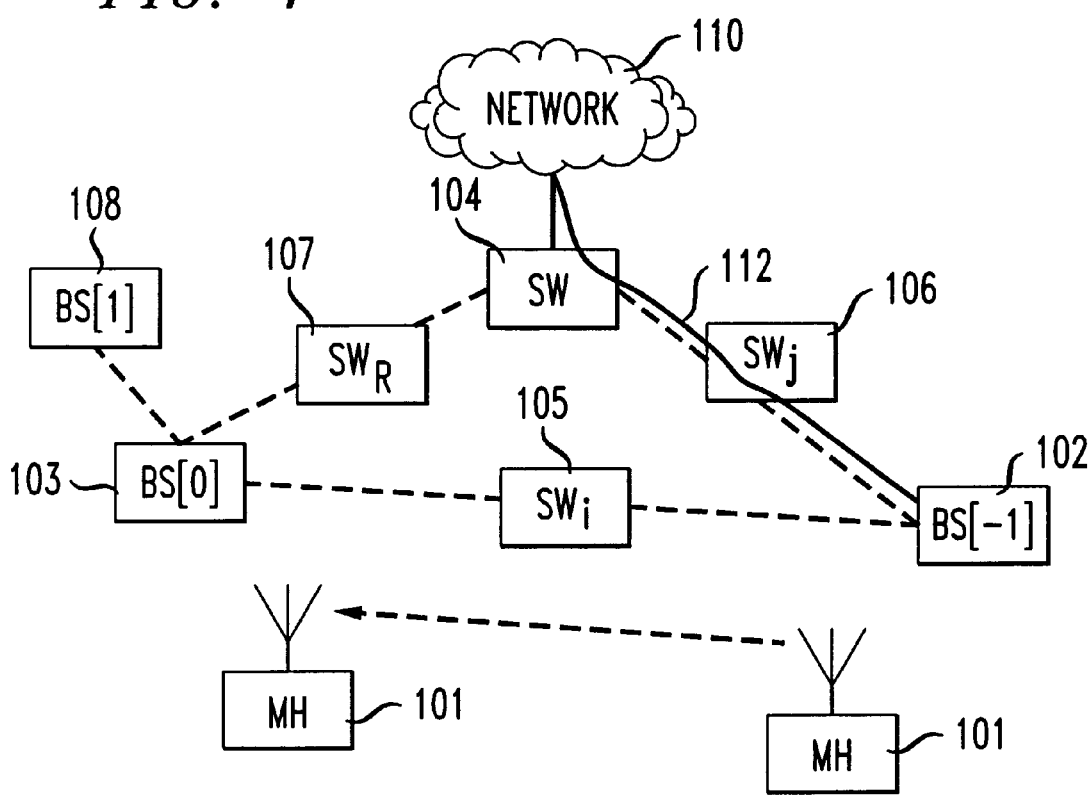
FIG. 4 illustrates execution of rerouting primitives according to the invention.

FIG. 4 shows a mobile host MH 101 connected to a backbone network 110 through a basestation BS[−1] 102, a rebuild switch SW 104 and a virtual circuit 112. An intermediate switch SW(j) 106 exists in the virtual circuit segment between the basestation BS[−1] 102 and the rebuild switch SW 104. Also connected to the backbone network 110 are basestations BS[0] 103 and BS[−1] 108. An intermediate switch SW(i) 105 exists between the basestation BS[−1] 102 and the basestation BS[0] 103. An intermediate switch SW(k) 107 exists between the basestation BS[0] 103 and the rebuild switch SW 104. As shown in FIG. 4, the mobile host MH 101 uses virtual circuit 112 when in the vicinity of the basestation BS[−1] 102. The mobile host MH 101 then moves to the vicinity of the basestation BS[0] 103. The mobile host MH 101 could continue to roam to the vicinity of the basestation BS[1] 108. The discussion that follows describes the effect of the mobile host 101 moving from the vicinity of the basestation BS[−1] 102 (the old basestation) to the vicinity of the basestation BS[0] 103 (the new basestation).

The roaming of the mobile host 101 requires the virtual circuit 112 to be rerouted to connect the new basestation BS[0] 103 to the mobile host 101 and the backbone network 110. Virtual circuit rerouting strategy can be viewed as composed of three primitives executed by the various elements shown in FIG. 4. The first primitive is selection of a suitable rebuild switch such as the rebuild switch SW 104. A rebuild switch may be selected based on a static topological criterion (e.g., a fixed known switch through which the virtual circuit must pass), or a dynamic criterion designed to optimize a performance metric (e.g., efficiency of network bandwidth and service quality—throughput and end-to-end delay). The second primitive is establishment of a new virtual circuit segment from the rebuild switch SW 104 to the new basestation BS[0] 103. The third primitive is tear-down of the old virtual circuit segment from the rebuild switch SW rebuild 104 to the old basestation BS[−1] 102.

Other virtual circuit rerouting strategies are described in U.S. Pat. No. 5,590,126. Described below are the mechanisms and signaling messages that can be used to implement the "partial rebuild" and other virtual rerouting strategies. The mechanics and signaling messages allow efficient implementation of common virtual circuit rerouting primitives that underlie most virtual circuit rerouting strategies.

Figure 5:
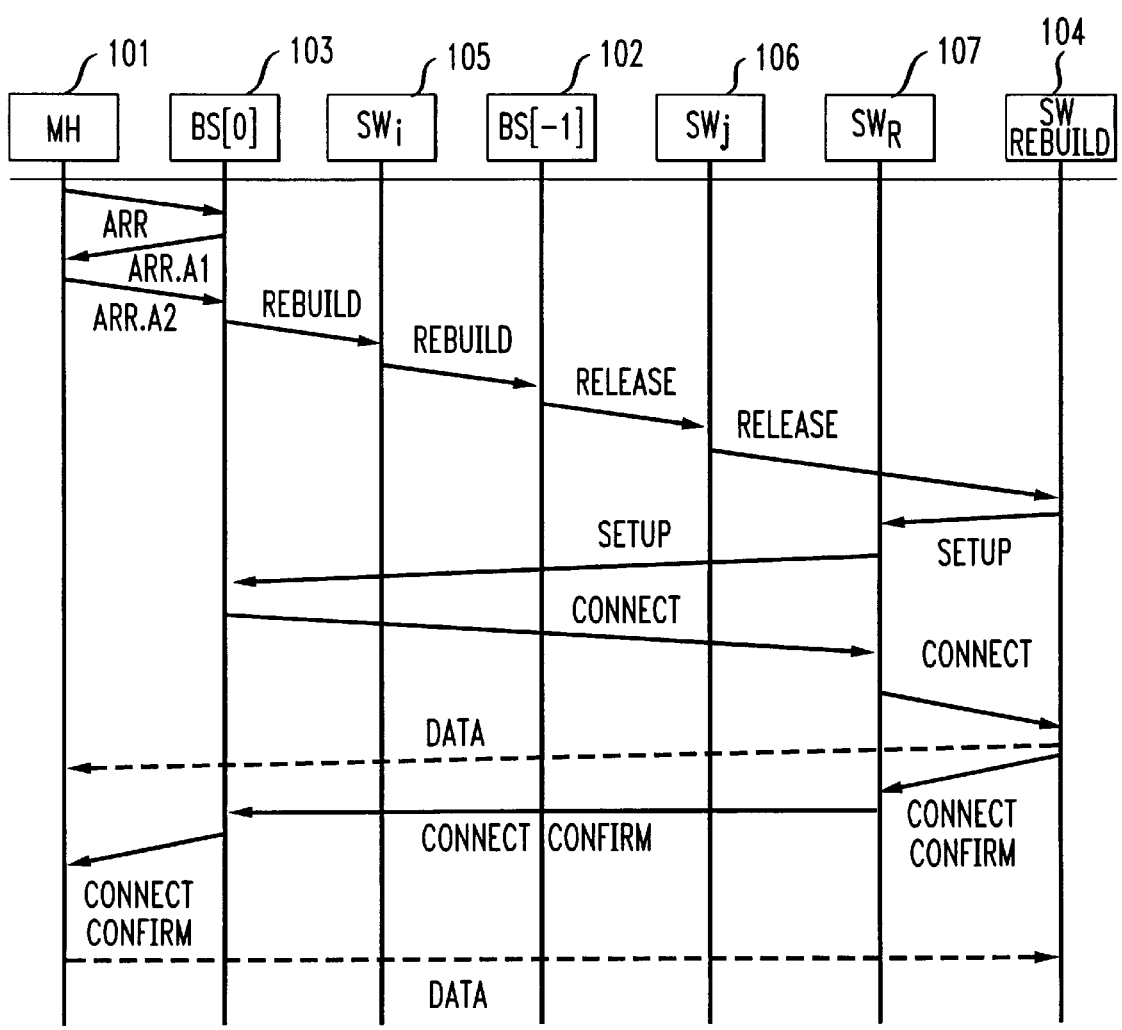
FIG. 5 is a timing chart explaining the execution of the rerouting primitives of FIG. 4.

Referring to FIG. 5, in conjunction with FIG. 4, there is shown a timeline representation for signaling message exchange to effectuate virtual circuit rerouting according to an embodiment of the invention. In the description that follows, the mobile host (MH) 101 moves from the old basestation BS[−1] 102 to the new basestation BS[0] 103, in a "hard hand-off" scenario.

The following method eliminates a need for the reliable transfer mode of the Service Specific Connection Oriented Protocol (SSCOP) for messages sent over the link between the mobile host MH 101 and the basestations BS [−1] 102–BS [1] 108. Instead, the mobile host MH 101 sends an acknowledgment (e.g., the ARR.A2 and Connect Confirm messages, which will be described later) in response to signaling messages from basestations BS [−1]–BS [1] 108. This allows an ATM signaling layer at the basestations BS [−1]–BS [1] 108 to distinguish between a message not being received because of transmission errors and a message not being received because the mobile host MH 101 has moved away from the cell controlled by a particular basestation. Further, by not using the reliable transfer mode of SSCOP, the method of this invention can reduce the latency associated with the hand-off. This is because the reliable transfer mode of SSCOP requires, prior to reestablishing the ATM signaling association between the mobile host MH 101 and the basestations BS [−1]–BS [1] 108 following a hand-off, a separate "handshake", further increasing the latency of the hand-off.

The mobile host MH 101 initiates the hand-off by sending an aggregate registration request (ARR) to the new basestation BS[0] 103. The ARR contains a network service access point (NSAP) address of the old basestation BS[−1] 102, and call reference values for all the virtual circuits terminating at and originating from the mobile host MH 101. Aggregating registration requests in this fashion, as compared to individual registration requests for separate virtual circuits, reduces signaling overhead over the power and bandwidth-limited wireless link between the mobile host MH 101 and the basestations. The new basestation BS[0] records the call reference values and sends a registration acknowledgment (ARR.A1) back to the mobile host MH 101. The ARR.A1 contains a new set of call reference values assigned to the new basestation BS[0] 103, one for each virtual circuit.

Next, the mobile host MH 101 sends an acknowledgment message ARR.A2 back to the new basestation BS[0] 103 to acknowledge receiving the ARR.A1 message. The new basestation BS[0] does not transmit a rebuild message into the backbone network 110 until the message ARR.A2 is received.

The message ARR.A2 is needed because if the mobile host MH 101 were to move to yet another cell, such as one controlled by the basestation BS[1] 108, just before receiving the message ARR.A1, the mobile host MH 101 would consider the registration as having failed. That is, the mobile host MH 101 was last at the basestation BS[0] 103, but since no data transfer occurred, the mobile host 101 determines that registration with the basestation BS[0] did not occur. Consequently, the mobile host MH 101 will identify the old basestation BS[−1] 102 as the previously visited basestation when it attempts to register with the next basestation BS[1] 108. This forces the old basestation BS[−1] 101 to distinguish two (or more) versions of the rerouting procedure for the same set of connections. Therefore, the message ARR.A2 performs the function of ensuring that the mobile host MH 101 and the new basestation BS[0] 103 both agree that the rerouting protocol can handle situations where the mobile host MH 101 moves again before the signaling associated with a particular hand-off has completed. Thus, the three-phase handshake ensures that the rerouting protocol can handle situations where the mobile host moves again before the signaling associated with a particular hand-off has completed.

The initial handshake (i.e., the ARR, ARR.A1 and ARR.A2 messages) also establishes a virtual circuit identifier (VCI) for a virtual circuit segment between the mobile host MH 101 and the new basestation BS[0] 103. Using the initial handshake to establish this VCI reduces the latency for reestablishing data communication between the mobile host MH 101 and the network 110.

Next, the new basestation BS[0] 103 forwards a Rebuild Request message to the old basestation BS[−1] 102. The Rebuild Request message is forwarded without being interpreted by the intermediate switches such as intermediate switch SW(i) 105. At the old basestation BS[−1] 102, the call reference values in the Rebuild Request message are modified. The old basestation BS[−1] 102 then issues a special Release message. The Release message contains an additional information element field identifying the new basestation BS[0] 103 as the new destination. The Release message backtracks along the path of the virtual circuit 112, with each switch in the path of the connection making a determination about whether it should act as a rebuild switch. This determination may be made, for example, when a switch, such as the rebuild switch SW 104 determines that it is a common node between the backbone network 110 and both the old basestation BS [−1] 102 and the new basestation BS[0] 103. When a switch determines that it should act as a rebuild switch, the switch (in this example the rebuild switch SW 104) issues a Setup Request message and transmits the Setup Request message to the new basestation BS[0] 103. The rebuild switch SW 104 also issues a Release Complete message to the old basestation BS[−1] 102.

Note that the Setup Request message terminates at the new basestation BS[0] 103 instead of at the mobile host MH 101. This is because the initial handshake (i.e. messages ARR, ARR.A1 and ARR.A2) establishes the VCI for the virtual circuit segment between the new basestation BS[0] 103 and the mobile host MH 101. Thus, the latency associated with reestablishing data communication with the network 110 is reduced.

The new basestation BS[0] 103 responds with a Connect message. Once the rebuild switch SW 104 receives the Connect message, it issues a Connect Confirm message and starts forwarding data to the new basestation BS[0] 103. The mobile host MH 101 and the new basestation BS[0] 103 are not allowed to start forwarding data towards the rebuild switch SW 104 over the newly built virtual circuit until the mobile host MH 101 and the new basestation BS[0] 103 receive the Connect Confirm message.

The additional Connect Confirm message prevents data being forwarded by the new basestation BS[0] 103 from overtaking the Setup message. For example, the tags that are used for forwarding data are created by the Setup and Connect messages. If the basestation BS[0] 103 were to start transmitting data before all of the virtual circuit segments had been created in the network, then some of the data could be lost.

Data could be lost for the following reasons. In an ATM network, messages like Setup or Connect are signaling messages that are propagated from switch to switch. Once the Setup and Connect messages arrive at a switch, software processing at the switch looks at the message, pulls out all the headers in the message, processes the message and then forwards the message to other switches, if appropriate. Because the Setup and Connect messages are processed by software at the switch, the Setup and Connect messages spend additional time at the switch. This time may be, for example, on the order of two to three milliseconds at every switch along the virtual circuit.

On the other hand, data forwarded by the basestation BS[0] 103 may purely involve a hardware operation. That is, when a data packet arrives at a switch, the switch determines the tag and the packet header from a routing table and forwards the data packet onto the next switch. This can be done on a time scale measured in microseconds, which is consistent with a purely hardware operation. Therefore, the data packets can travel much faster in the network than the Setup and Connect messages.

If the data packets were transmitted from the basestation BS[0] 103 before the Setup and Connect messages were processed, and the virtual circuit established, the elements in the network such as the switches, will not be able to interpret the destination of the data packets. Accordingly, the data packets will become lost. The new signaling message Connect Confirm prevents this situation from occurring in an ATM network with mobile hosts.

As shown in FIG. 2, the controller 21 is preferably implemented on a programmed general purpose computer. However, the controller 21 can also be implemented on a special purpose computer, programmed microprocessor or micro-controller and peripheral integrated circuit elements, an ASIC or other integrated circuit, a digital signal processor, a hardwired electronic or logic circuit such as a discrete element circuit, a programmable logic device such as a TLD, TLA, FPGA or PAL, or the like. In general, any device implementing a finite state machine capable of providing the message sequences shown in FIG. 5 can be used to implement the controller 21.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of rerouting a virtual circuit in a network for ATM communications, the virtual circuit including at least one switch, wherein a mobile device is wirelessly coupled to the network via basestations, each of the basestations having a corresponding predetermined cell boundary in the network, the method comprising a three-way handshake including:

an aggregate registration request from the mobile device to a first basestation;

a reply from the first basestation to the mobile device;

an acknowledgment from the mobile device to the first basestation; wherein, if the three-way handshake is completed, a rebuild request from the first basestation is sent to a second basestation, the rebuild request including call reference values for a rerouted virtual circuit; and modifying the call reference values in the second basestation.

2. The method of claim 1, further comprising sending a release message from the second basestation back through the virtual circuit, the release message indicating the first basestation as an element in the rerouted virtual circuit.

3. The method of claim 2, further comprising each switch in the network encountered by the release message, propagating from the second basestation back through the virtual circuit, determining whether to act as a rebuild switch.

4. The method of claim 3, wherein, when a switch in the network is identified as the rebuild switch, the rebuild switch sends a setup request message to the first basestation and sends a release complete message to the second basestation.

5. The method of claim 4, wherein the first basestation, upon receiving the setup request message, sends a connect message to the rebuild switch.

6. The method of claim 5, further comprising:

sending a connect confirm message from the rebuild switch to the mobile device; and receiving data from the mobile device in the first basestation.

7. The method of claim 6, wherein the reply from the first basestation and the connect confirm message ensure reliable data transfer and a Service Specific Connection Oriented Protocol is not used.

8. The method of claim 1, wherein the aggregate registration request and the reply from the first basestation eliminate a wait time associated with establishing a virtual circuit segment between the mobile device and a basestation.

9. A method for maintaining virtual circuit connectivity in a network, the network supporting at least one mobile device that wirelessly communicates with the network via basestations, comprising:

performing a handshake sequence between the mobile device and a first basestation, the handshake sequence registering the first basestation as an element in a rerouted virtual circuit;

establishing a rerouted virtual circuit between the network and the mobile device by sending a connect confirm message from the rebuild switch to the mobile device via the first basestation, wherein the rerouted virtual circuit includes the first basestation and the rebuild switch, and if the connect confirm message is received by the first basestation, allowing the mobile device to start forwarding data in the network.

10. The method of claim 9, further comprising receiving data from the mobile device after receipt of the connect confirm message.

11. The method of claim 10, wherein the handshake sequence includes receiving an acknowledgment from the mobile device in the first basestation.

12. The method of claim 11, wherein the rebuild switch is identified after completion of the handshake sequence.

13. A method of rerouting calls in a network, the network supporting mobile devices wirelessly coupled to the network via basestations, and including a virtual circuit routing mechanism to reroute virtual circuit connections for transmission of data in the network, the method comprising:

registering a mobile device with a basestation;

receiving a confirmation of the registration of the mobile device with the basestation;

issuing a rebuild request to identify a rebuild switch;

confirming a connection between the rebuild switch and the mobile device by sending a connect confirm message from the rebuild switch to the mobile device via the basestation, wherein the rerouted virtual circuit includes the basestation and the rebuild switch, and if the connect confirm message is received by the basestation, allowing the mobile device to start forwarding data in the network.

14. The method of claim 13, further comprising receiving data from the mobile device in the network, receipt of data from the mobile device occurring only after receipt of the connection confirm message in the mobile device.

15. An apparatus for rerouting a virtual circuit in an ATM network, the network supporting at least one mobile device wirelessly coupled to the network, comprising:

a first basestation, the first basestation having first associated cells with given cell boundaries, a second basestation coupled to the first basestation, the second basestation having second associated cells with given cell boundaries, and at least one switch coupled to the first and the second basestations, the at least one switch acting as a rebuild switch in a rerouted ATM virtual circuit;

wherein a mobile device and the first and the second basestations execute a three-way handshake when the mobile device moves from the first associated cell boundaries to the second associated cell boundaries and wherein the rebuild switch sends a connect confirm message to the mobile device before the mobile device transfers data to the network via the rerouted ATM virtual circuit.

16. The apparatus of claim 15, wherein the first basestation sends a rebuild request to the second basestation, the rebuild request including call reference values for the rerouted virtual circuit.

17. The apparatus of claim 16, wherein the second basestation modifies the call reference values and sends a release message back through the virtual circuit, the release message indicating the first basestation as an element in the rerouted virtual circuit.

18. The apparatus of claim 17, wherein the rebuild switch sends a setup request message to the first basestation and sends a release complete message to the second basestation.

19. The apparatus of claim 18, wherein the first basestation, upon receiving the setup message, sends a connect message to the rebuild switch.

20. A method of rerouting a virtual circuit in a network for ATM communications, the virtual circuit including at least one switch, wherein a mobile device is wirelessly coupled to the network via basestations, each of the basestations having a corresponding predetermined cell boundary in the network, the method comprising:

sending a connect message to a rebuild switch from the mobile device; and sending a connect confirm message from the rebuild switch to a basestation and the mobile device, wherein the mobile device and the basestation are prevented from forwarding data to the rebuild switch until the connect confirm message is received in both the mobile device and the basestation.

* * * * *